T. J. CORNELL.
Plow.
No. 52,807.
Patented Feb. 20, 1866.
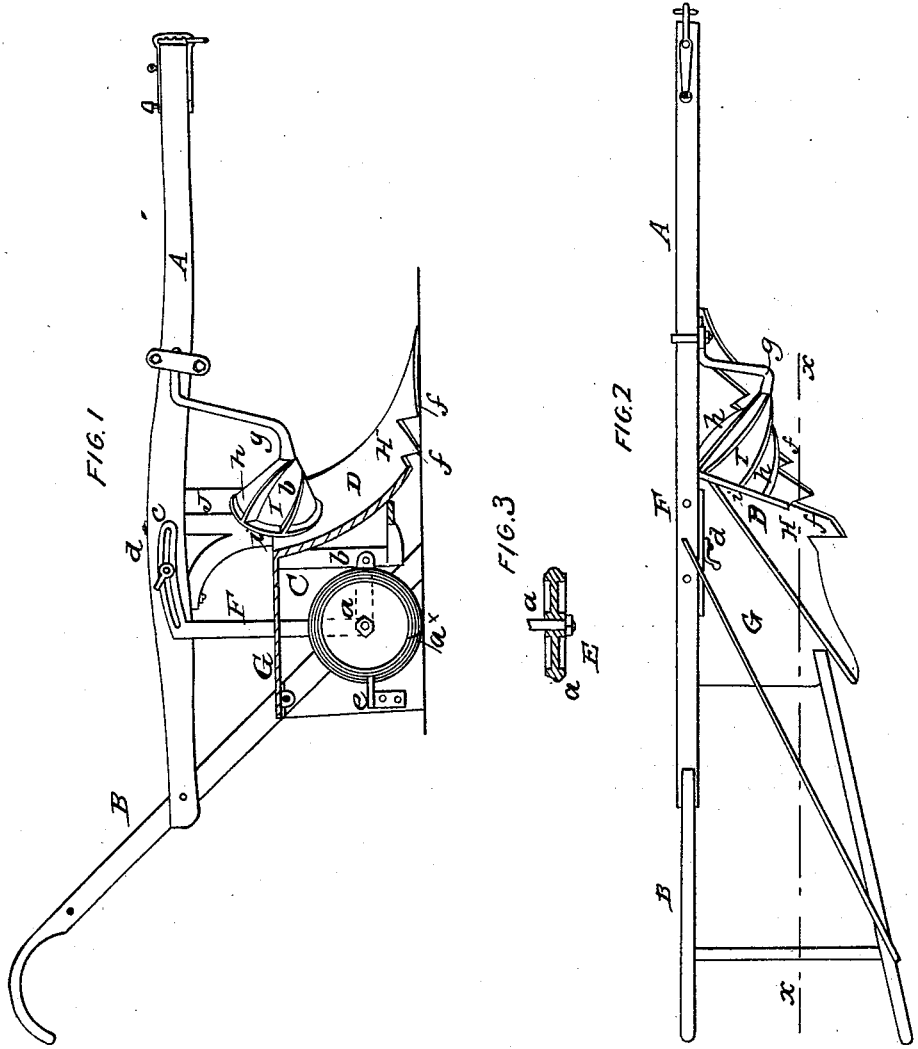
WITNESSES.
INVENTOR

UNITED STATES PATENT OFFICE.

THOS. J. CORNELL, OF DECATUR, ILLINOIS.

IMPROVEMENT IN PLOWS.

Specification forming part of Letters Patent No. 52,807, dated February 20, 1866.

*To all whom it may concern:*

Be it known that I, THOMAS J. CORNELL, of Decatur, in the county of Macon and State of Illinois, have invented a new and Improved Plow; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\,x$, Fig. 2; Fig. 2, a plan or top view of the same; Fig. 3, a detached view of a wheel pertaining to the same.

Similar letters of reference indicate corresponding parts.

This invention relates to certain improvements in plows, whereby the draft of the same is materially diminished, the earth pulverized and left in a better condition after plowing than hitherto, and the plow prevented from clogging or choking up—a contingency of frequent occurrence with the ordinary plows.

A represents the beam of the plow, and B B the handles thereof. C is the landside, and D the mold-board. E is a wheel, which is placed within the plow between the landside C and mold-board D. This wheel E has its axis $a$ fitted in the angle of a bent or right-angular bar, F, the outer end of the lower arm of which is secured by a pivot-bolt, $b$, to the landside of the plow, or to any fixture of the latter. The upper end of the bar F is curved forward, forming a portion of a circle of which the pivot-bolt $b$ is the center, and said arm has an oblong slot, $c$, made longitudinally in it, through which a set-screw, $d$, passes into the beam. By this arrangement the wheel E may be adjusted higher or lower, as desired, so as to ease the pressure of the sole of the plow on the bottom of the furrow.

The periphery of the wheel E is beveled to form a V-shaped edge, as shown clearly in Fig. 3, at $a^\times$. This wheel runs upon the bottom of the furrow, and is designed to obviate friction and prevent the bottom of the furrow being compacted by the pressure of the sole of the plow, and the beveled edge prevents earth from adhering to the periphery of the wheel, or if it does adhere at all only to a very limited extent, so that a scraper, $e$, attached to the landside will insure the wheel being kept clean. The wheel is kept clear from earth, or clods of earth are prevented from falling upon it, by means of a plate, G, which fills the space between the upper edge of the mold-board and the upper edge of the landside.

The share H of the mold-board is constructed in a novel way, it being provided with teeth $f$ at about three inches apart, the front or cutting edges of the same receding back about one inch from right angles with the landside in order to prevent clogging. The cutting-edges of these teeth are made sufficiently sharp to cut the earth, and instead of cutting it of one width, or in a whole or entire slice, as is the case with the ordinary share, they cut the furrow-slice into small strips, so that when it is turned over by the mold-board the earth will be pulverized or plowed much finer than usual.

I represents a wheel of cone shape and placed at the upper part of the mold-board, said wheel having its axis $g$ about at right angles with the face of the mold-board, the smaller end of the wheel being outward. The axis $g$ of the wheel I is attached to the beam A, and is so curved or bent as to have the portion the wheel I runs upon in the position above specified. The wheel has wings or blades $h$ projecting from its periphery, which blades have a slight spiral twist, and the inner large end of the wheel has a circular plate, $i$, attached to it, the edge of which extends outward as far as the outer edges of the wings or blades $h$. This wheel I, as the plow is drawn along, is rotated by the action of the furrow-slices raised and turned over by the mold-board, and said wheel breaks the narrow furrow-slices and causes the plowed earth to be pulverized and left in a much better condition than usual for the cultivation and propagation of crops, and the plow is prevented from being choked or clogged up by trash. Grass, weeds, and trash are prevented from passing behind the wheel I by means of a plate, J, attached to the standard of the plow and projecting in front of the edge of plate $i$.

Having thus described my invention, I claim as new and desire to secure by Letters Patent—

1. The plate or cover G, placed between the upper edges of the landside and mold-board, when used in connection with the wheel E, for the purpose specified.

2. The wheel I, constructed and arranged substantially as shown, journaled on a horizontal axis set obliquely the line of draft, and rotated by contact with the furrow-slice.

THOS. J. CORNELL.

Witnesses:
SAMUEL KINNEY,
A. NICHOLS.